No. 861,447. PATENTED JULY 30, 1907.
W. ERDMANN.
FLY NET.
APPLICATION FILED NOV. 24, 1906.
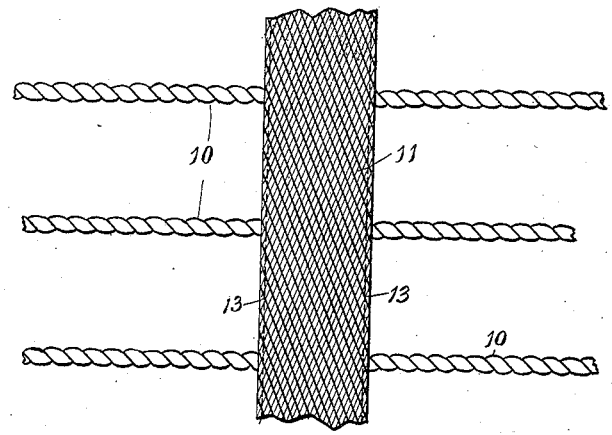
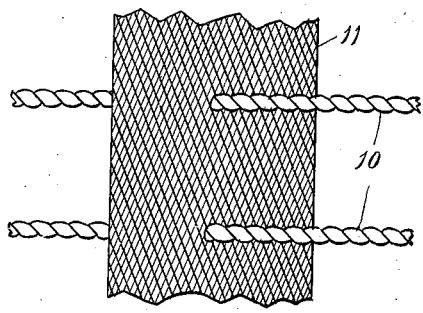
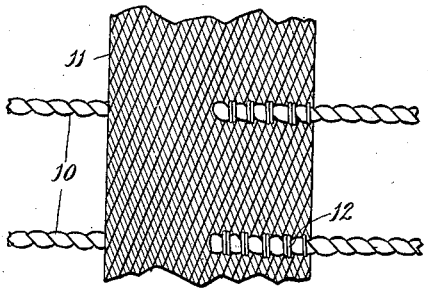
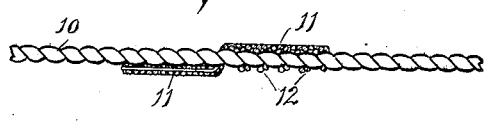
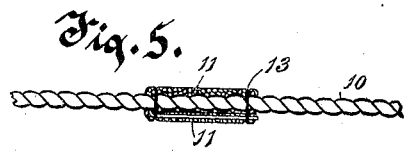
Witnesses. Inventor.
William Erdmann
By Benedict, Morsell & Caldwell.
Attorneys.
THE NORRIS PETERS CO., WASHINGTON, D. C.

UNITED STATES PATENT OFFICE.

WILLIAM ERDMANN, OF MILWAUKEE, WISCONSIN, ASSIGNOR TO GEM HAMMOCK & FLY NET COMPANY, OF MILWAUKEE, WISCONSIN, A CORPORATION OF WISCONSIN.

FLY-NET.

No. 861,447.

Specification of Letters Patent.

Patented July 30, 1907.

Application filed November 24, 1906. Serial No. 344,829.

*To all whom it may concern:*

Be it known that I, WILLIAM ERDMANN, residing in Milwaukee, in the county of Milwaukee and State of Wisconsin, have invented new and useful Improvements in Fly-Nets, of which the following is a description, reference being had to the accompanying drawings, which are a part of this specification.

This invention has for its object to produce a fly net of strong and durable construction wherein the bars are formed in such a manner that the cords are interwoven therewith across half of the width of the bar material so as to stand out on one side thereof and then pass through openings in the bar material, the other half of said bar material being folded over upon the first mentioned half thereof and stitched thereto to constitute the bars of double thickness with the cords passing between the folds thereof.

With the above and other objects in view the invention consists in the fly nets herein claimed and all equivalents.

Referring to the accompanying drawings in which like characters of reference indicate the same parts in the several views:—

Figure 1 is a view of a fragment of a fly net constructed in accordance with this invention; Figs. 2 and 3 are similar views showing opposite sides of the bar material before it is folded and stitched; Fig. 4 is a transverse sectional view through the bar material showing a cord interwoven with a half section thereof; and, Fig. 5 is a similar view after the bar material has been folded and stitched.

In these drawings 10 represents the cords of a fly net which are arranged parallel as usual and are secured to bars formed of strips of woven bar material 11. The cords 10 are introduced during the weaving of the bar material 11 and constitute woof threads thereof for approximately one half the width of the bar material, being above the plane of the weave of the bar material and passing through the bar material at the middle thereof to the other side, as clearly shown in Fig. 3. The cords are only engaged by a sufficient number of warp threads 12 of the bar material to securely bind them in place.

When the cords are thus interwoven with one edge of the bar material the other edge is folded over upon the interwoven edge so as to infold the cords between the two and the folded bar material is then stitched along both edges, as at 13, to make the complete doubled bar with the cords held securely between the folds thereof, not only by being interwoven with one fold but by the stitching 13.

A fly net constructed in accordance with this invention has the same appearance on both sides, the cords passing through the double bars and secured in place without the use of visible engaging means. The doubled woven bars are strong and durable and are inexpensive to produce.

What I claim as my invention is:

1. A fly net, comprising cords, and a bar of woven material folded upon itself longitudinally and having the cords interwoven with one fold thereof and standing up out of the plane of the weave of the bar material with the other fold covering the interwoven portions of the cords.

2. A fly net, comprising cords, and a bar of woven material folded upon itself longitudinally, the cords being interwoven with one fold of the bar material and passing through the bar material between the folds thereof and standing up out of the plane of weave of the fold of bar material with which they are interwoven, the other fold of bar material covering the interwoven portions of the cords, and lines of stitching passing through the edges of the folded bar material and the cords.

In testimony whereof, I affix my signature, in presence of two witnesses.

WILLIAM ERDMANN.

Witnesses:
ANNA F. SCHMIDTBAUER,
ALMA A. KLUG.